United States Patent [19]
Heber

[11] Patent Number: 5,421,316
[45] Date of Patent: Jun. 6, 1995

[54] CONVEYOR OVEN WITH IMPROVED AIR FLOW

[75] Inventor: Albert J. Heber, Delphi, Ind.

[73] Assignee: G. S. Blodgett Corporation, Burlington, Vt.

[21] Appl. No.: 188,870

[22] Filed: Jan. 31, 1994

[51] Int. Cl.$^6$ .............................................. F24C 15/32
[52] U.S. Cl. .................................. 126/21 A; 432/145; 432/150
[58] Field of Search ............. 126/21 A; 432/145, 150; 219/400

[56] References Cited

U.S. PATENT DOCUMENTS

| | | |
|---|---|---|
| 3,908,533 | 9/1975 | Fagerstrom et al. . |
| 4,377,109 | 3/1983 | Brown et al. . |
| 4,471,000 | 9/1984 | Brown et al. . |
| 4,471,750 | 9/1984 | Burtea . |
| 4,576,090 | 3/1986 | Burtea . |
| 4,591,333 | 5/1986 | Henke . |
| 4,626,661 | 12/1986 | Henke . |
| 4,679,542 | 7/1987 | Smith et al. . |
| 4,701,340 | 10/1987 | Bratton et al. . |
| 4,960,100 | 10/1990 | Pellicane . |
| 5,231,920 | 8/1993 | Alden et al. . |

*Primary Examiner*—Carroll B. Dority
*Attorney, Agent, or Firm*—Lowe, Price, LeBlanc & Becker

[57] ABSTRACT

A conveyor oven is described having increased efficiency from enhanced flow therethrough. The oven consists of an upper plenum, a lower plenum, and a return plenum. The upper plenum is disposed above the conveyor and dispenses heated air through nozzles downwardly. The lower plenum is disposed below the conveyor and dispenses heated air upwardly. The upper and lower plenums are tapered from a maximum width of 2½ inches to a minimum of no more than 15% thereof across the path of travel of the conveyor. A blower having a vertical axis of rotation is located at a midpoint between the upper plenum and the conveyor and a burner is located below the inlet between the inlet thereto and the return plenum. The outlet from the blower directs air through scrolls onto a baffle plate having rounded edges and from there into the upper and lower plenums. This scroll-like pattern with rounded edges and, in combination therewith, a similar scroll surrounding the burner tube directing air from the return plenum through the burner tube and into the fan has been found to be responsible for the improved efficiency.

10 Claims, 5 Drawing Sheets

CONVEYOR OVEN WITH IMPROVED AIR FLOW

BACKGROUND OF THE INVENTION

1. Field of the Invention

This invention relates to a conveyor oven for cooking food products, and in particular to a conveyor oven utilizing heated convection air currents as a cooking source. This invention is an improvement over the ovens described in U.S. Pat. Nos. 4,471,750; 4,576,090; and 4,960,100 and the disclosures thereof are hereby incorporated by reference.

2. Description of the Prior Art

Conveyor ovens or tunnel heaters have been in use for several years primarily in the fast food industry to cook pizzas and the like. While conveyor ovens are also known for use in a variety of non-food related industries, this invention relates to the food processing industry.

In the cooking of pizza, it is necessary to apply different heating conditions to the crust and to the topping. The dough shell should be cooked thoroughly to provide a tender, crisp crust. If the heating conditions applied to the dough shell however, are applied to the topping, the cheese will in all likelihood burn, or loose topping materials may be dislodged by high velocity convection currents if the product is initially frozen. Topping materials are typically retained by the melted cheese. Therefore it is desirable to melt the cheese without subjecting the topping to the high velocity convection currents necessary to cook the crust.

In U.S. Pat. Nos. 4,377,109 and 4,471,000, hot air under pressure from a burner is introduced into nozzles which are disposed only below the product to be cooked. As the product passes along through the conveyor oven, the hot air currents directly impinge on the crust. However, the space on the conveyor between products to be cooked permits the exposed nozzles to direct heated air against the cooking chamber overhead whereupon a stream of heated air is reflected downwardly onto the surface of the product to be cooked. Therefore, the underside of the pizza is subjected to heated air at a much higher velocity and therefore higher temperature than the upper surface which contains the toppings, cheese and the like.

In U.S. Pat. Nos. 4,471,750 and 4,576,090 there are provided foraminous air plates both above and below the product to be cooked which are mutually spaced and separated by non-foraminous plates so that the product is subjected to a blanket of turbulent heated air both above and below as it passes through the foraminous plate section and then to heat under much lower velocity as it passes through the imperforate zone. Products then pass through non-discreet zones of high and relatively low convection heating. This permits moisture within the product to migrate to the surface as the product passes through the imperforate zone so that the moisture can evaporate as the product passes through the high convection heating zone.

These patents also describe a novel air flow system whereby heated air from the burner is blown through a scroll-shaped passageway and a venturi section into a plenum for increased turbulence so that air passing through the perforate sections onto the product will be in turbulent flow. The burner is disposed in front of the blower and its longitudinal axis is contained in the plane containing the axis of rotation of the blower and the upper surface of the conveyor belt, so that return air from the cooking chamber is heated by the burner and directed axially into the blower which dispenses the heated air radially, both above and below, into the respective plenums.

One problem associated with such conveyor ovens is the need to dispense heated air uniformly across the path of travel of the conveyor so that the food travelling on the conveyor will be cooked evenly. In, for example, U.S. Pat. Nos. 4,377,109 and 4,471,000, elongated slit nozzles are provided across the lower portion of the cooking area below the conveyor. In contrast, the nozzles provided in, for example, U.S. Pat. Nos. 4,591,333, 4,626,661, and 4,679,542 are individual circular nozzles with a plurality thereof being mutually spaced across the area of the cooking chamber.

Similarly, in U.S. Pat. No. 3,908,533 slit nozzles are also provided which extend transverse to the path of travel of the conveyor and in U.S. Pat. No. 4,701,340, discrete jets are described as being disposed above and below the food to be cooked at the beginning and the ending of the heating chamber with a center portion of the chamber having discrete jets below the food and steam above.

In these convection ovens typically, heated air from one or more blowers is accumulated in a plenum and disbursed into individual fingers which in turn feed the nozzles. In, for example, U.S. Pat. No. 4,576,090, the fingers slope away from the blower so that the crosssection of each finger diminishes as the distance from the blower increases. This design is an attempt to regulate the pressure behind the nozzles for uniform flow therethrough. In U.S. Pat. No. 5,231,920, individual finger elements are described which are constant in cross-section but are provided with a pair of baffle plates within each finger. An upstream baffle plate is provided adjacent the entrance to the finger disposed in an acute angle to the flow therethrough and a downstream baffle plate is provided parallel to the longitudinal axis of the individual finger. This design also is an attempt to provide a constant velocity through nozzles along the length of the finger.

In conveyor ovens however, the design of the nozzles and the fingers and in fact the upstream plenum may account for a wide variation in blower capacity in order to achieve optimum cooking conditions. In other words, because of a torturous path required for the heated air to travel from the blower to exit the nozzles in a uniform flow, an over pressure may be required. This can be a disadvantage in that the blowers are quite noisy and excess heated air often is released into the surrounding atmosphere.

Typically in a fast food environment, it will be desired to provide a plurality of such ovens, preferably stacked, and each oven may have for example three blowers. Of necessity, the entrance and exit from each oven is open and therefore, an over designed blower system will produce a great deal of unnecessary noise and excess heat. In addition, as will be obvious to those skilled in the art, an over designed blower and heating system will be more expensive to operate, in addition to creating an undesirable atmosphere for the food handlers.

SUMMARY OF THE INVENTION

It has been discovered however that the plenum and air transport system within a conveyor oven can be designed to optimize the flow rates therethrough and thereby achieve optimum cooking conditions with a blower capacity normally considered adequate only for a much smaller oven. In fact, the oven design of this invention has achieved at least a 73% increase in efficiency over conventional units.

The oven of this invention utilizes vertically tapered nozzle fingers, below the conveyor, and a vertically tapered plenum above the conveyor, to provide uniform jet air velocities. The taper is intended to keep the static pressure constant along the length of the plenum, across the conveyor, with the narrowest section being about 15% of the initial height. Each plenum has an inlet which is designed to minimize the jet-producing corners contractions by providing smooth bends in the air distribution manifold, and by enlarging the inlet area with a series of rounded corners, provided wherever possible. A square corner or sharp edge causes the air flow passing through or around to separate, and jump over the nearest holes or nozzles in the plenum. It is intended then to minimize an "elbow effect" to improve the air velocity profile at the plenum entrance. Typically the height at each finger entrance is 2.5 inches whereas the height at the downstream end is 0.5 inches, and the nozzle fingers are 4 inches wide.

In addition, the device of this invention is provided with three plenums. An upper plenum is provided for the upper nozzles, a plurality of nozzle fingers are provided below the conveyor which are technically described as individual plenums, and a return plenum is provided. The fan to feed the upper and nozzle finger plenums is disposed midway between the two plenum entrances so that the fan discharges into a rounded ducting system which divides the flow equally between the two plenums. The fan then has a vertical axis of rotation.

In contrast to previous designs, the burner box is not disposed downstream of the fan but rather upstream between the return plenum and the fan inlet. The burner may be gas or electric and typically is shortened design to fit within the tapered portion of the plenum fingers and to minimize the obstruction to the return flow of air to the fan. The return flow of air then passes around the burner and enters the fan from below to be expelled radially into the upper and lower plenums. The conduit system then which conveys heated air from the fan into the plenums and from the return plenum into the fan inlet is designed to eliminate all elbows and sharp corners for a smooth transitional flow. It has been discovered that by eliminating these elements of conventional oven design, the efficiency of the oven can be dramatically increased at least to about 73% whereby the oven cooking area can be 73% larger than conventional ovens with existing blowers.

Accordingly, it is an object of this invention to provide a convection oven of conveyor design in which the air flow therethrough is optimized.

It is another object of this invention to provide a convection conveyor oven utilizing either gas or electricity as a heating medium in a burner box disposed below the blower designed to feed plenums above and below the conveyor whereby the air flow from the burner, through the fan and into the plenums avoids all elbows or sharp bends and whereby the fan is disposed equidistantly between an upper plenum and a plurality of lower plenum fingers which dispense heated air through nozzles onto the conveyor.

It is a further object of this invention to provide a method for efficiently cooking with a conveyor oven wherein an upper plenum is provided for dispensing heated air through nozzles intermittently spaced along the path of the conveyor and a plurality of plenum fingers are provided below the conveyor for dispensing heated air currents upwardly along the bottom of the food to be cooked as it passes through the conveyor and a return plenum is provided wherein the burner or source of heat for the oven is disposed in the return plenum and a blower is disposed downstream of the burner which dispenses equidistantly between the upper and lower plenums and an unobstructed stream for maximum efficiency.

These and other objects will become readily apparent with reference to the drawings and following description wherein.

DETAILED DESCRIPTION OF THE INVENTION

Figure 1:
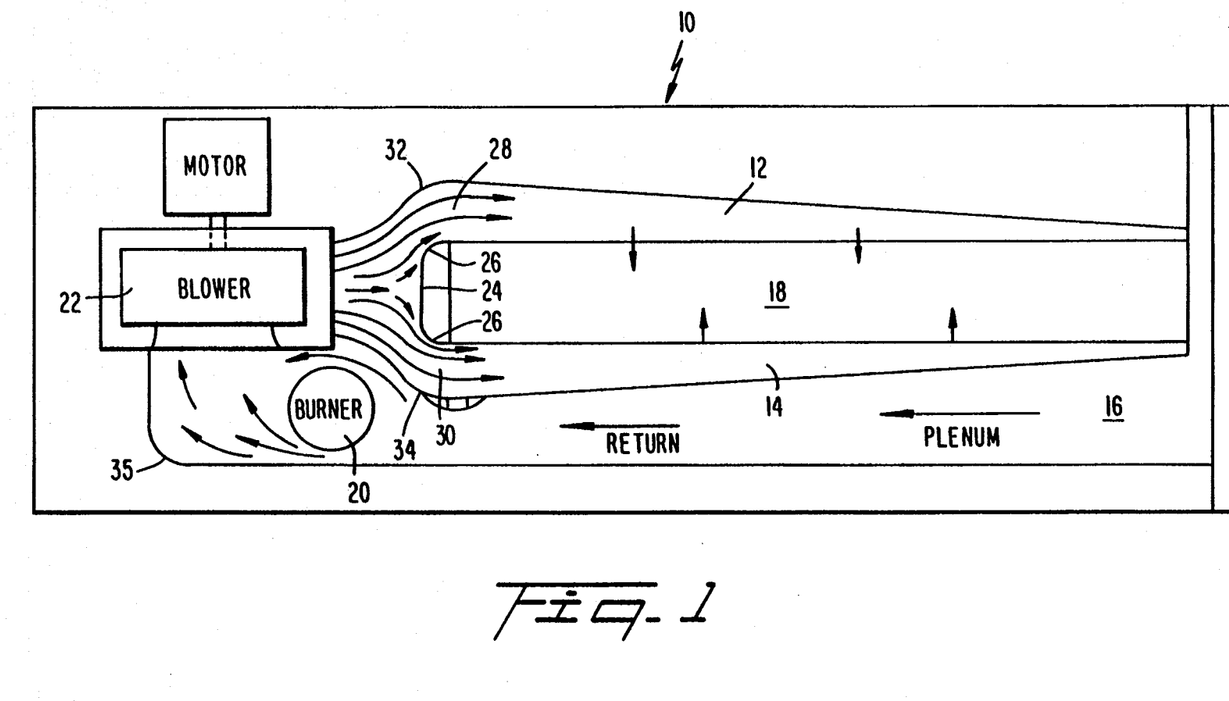
FIG. 1 is a schematic cross-sectional view of the oven of this invention.

With attention to the drawings and to FIG. 1, in particular, the conveyor oven of this invention 10 in general provides an upper plenum 12 for dispensing hot air downwardly, a lower plenum 14 for dispensing heated air upwardly, and a return plenum 16. The area between plenums 12 and 14 is a cooking area containing a conveyor, as will be subsequently described, upon which food is cooked. The area 18 between upper plenum 12 and lower plenum 14 is the cooking area. Heated air from the cooking area 18 then enters the return plenum 16. The air is reheated at burner 20 and then is drawn into blower 22. The air from blower 22 then is expelled radially and is divided by baffle 24 so that it is split between upper plenum 12 and lower plenum 14.

As will be subsequently explained, it has been discovered that the orientation of the blower 22 wherein the axis of rotation is vertical and the blower 22 is disposed equidistantly between upper plenum 12 and lower plenum 14 and the fact that baffle 24 has specifically rounded corners 26 and the inlet 28 to upper plenum 12 and 30 to lower plenum 14 has rounded corners or scroll plates 32 and 34 and the rounded corner or scroll plates 35 at the blower inlet will result in a marked improved aerodynamic efficiency of this oven.

Figure 2:
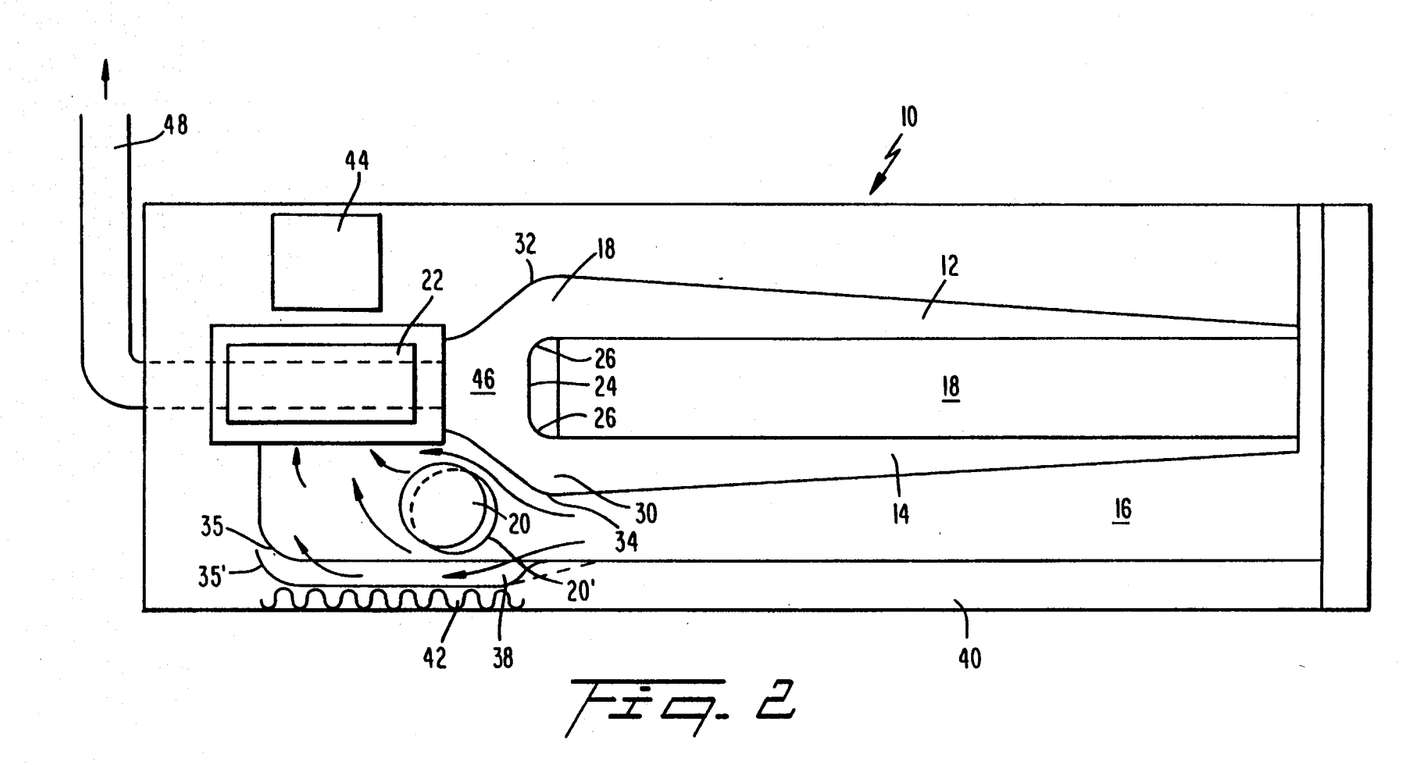
FIG. 2 is a view similar to FIG. 1 showing an alternate embodiment where the burner is spaced.

With attention to FIG. 2, the burner 20 in the oven of this invention can be electrical or gas and is a conventional tube-type burner. As will be seen, it is a major obstruction in the flow path from the return plenum 16 into the intake of fan 22. As shown in FIG. 2, the burner can be moved rearwardly to the position 20' shown and a widened flow path provided by scooped-out portion 38 and rounded scroll portion 35'. As will be obvious to those skilled in the art, this results in a portion of the base 40 having a diminished thickness of insulation 42 with the result that there will be a hot spot on the bottom of the oven in this area. Ovens 10 are normally stacked in that typically they are only about 18 inches high. It may be undesirable to have a hot spot resulting from the scooped-out portion 38 depending upon the configuration for mounting the unit 10.

In addition, as shown in FIG. 2, the fan 22 driven by motor 44 empties the heated air into a fan outlet 46 where the flow encounters baffle 24 and is split. A flue 48 is provided in communication with the fan outlet area 46, as will be subsequently explained. In the preferred embodiment of this invention, a conveyor having a width of 32 inches is provided in the cooking chamber 18 and the horizontal length of plenums 12 and 14 is 33 inches. The overall height of the oven 10 is 18 inches and the length of the conveyor shown in FIG. 5 which extends through the cooking area 18 is 40 inches. With these dimensions then corners 26 on baffle plate 24 are rounded on a 1.25 inch radius and the corners 32 and 34 are rounded on a 2 inch radius with the lower rounded corner 34 providing a common wall between the inlet 30 to plenum 14, and the outlet from plenum 16 which returns air to the heater 20. In a tunnel then which is substantially 40 inches by 33 inches, having the configuration above-described, has resulted in an increased airflow of about 73% over conventionally designed ovens which use sharp edges and elbows in conduits directing the airflow.

Figure 3:
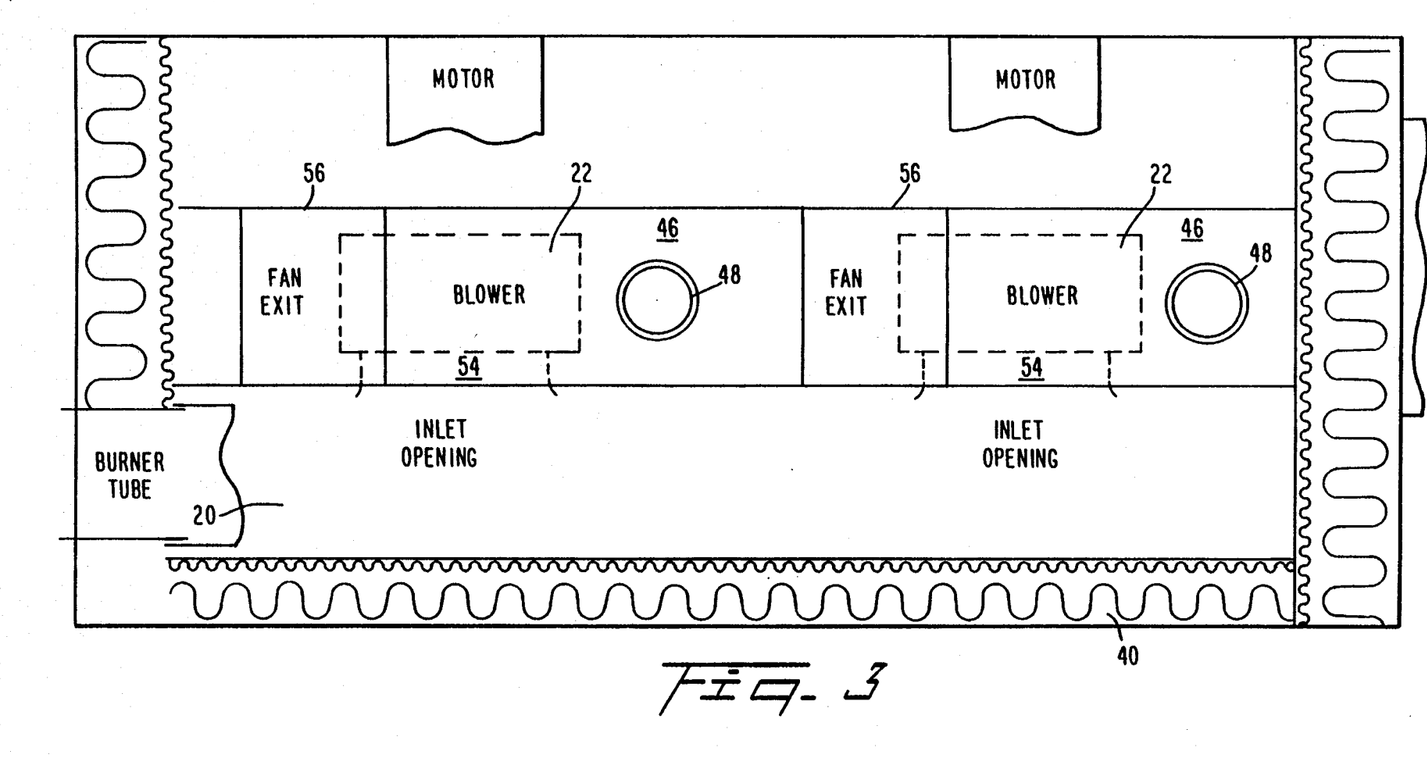
FIG. 3 is a longitudinal section looking into the blowers.
Figure 4:
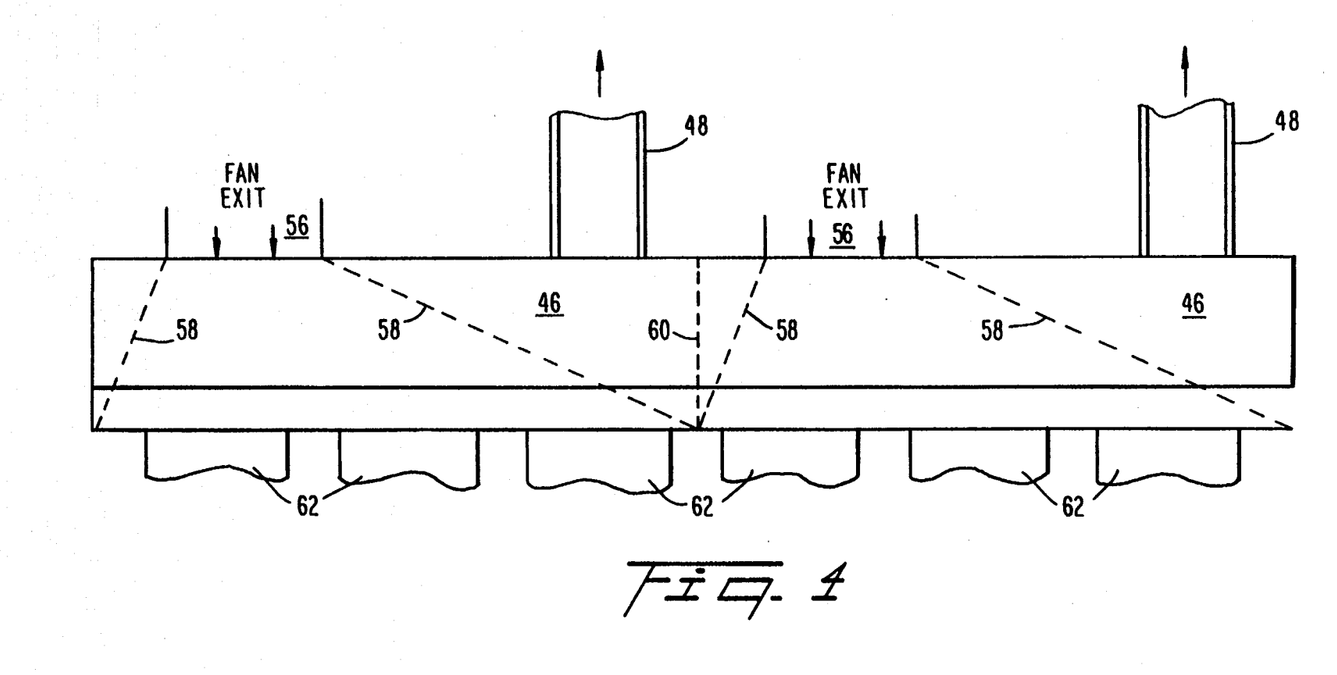
FIG. 4 is a fragmentary top view illustrating the fan outlets.

With attention to FIGS. 3 and 4, the blower fan 22 has an inlet 54 which communicates through the burner tube 20 with the return plenum 16. The blowers expel heated air through fan exits 56 into the transition scroll area 46 before the inlets 28 and 30 to the upper and lower plenums 12 and 14 wherein corners 32 and 34 function as scroll plates to direct heated air from exit 56 into plenums 12 and 14. The blowers 22 rotate counterclockwise as seen from [he top so that the heated air is expelled radially into the fan exit. In a preferred embodiment of this invention, the transition area 46 is traversed by baffle plates 58 which are angled as shown in FIG. 4. In the alternative, a single divider plate 60 may be provided merely dividing the transition area 46.

Figure 5:
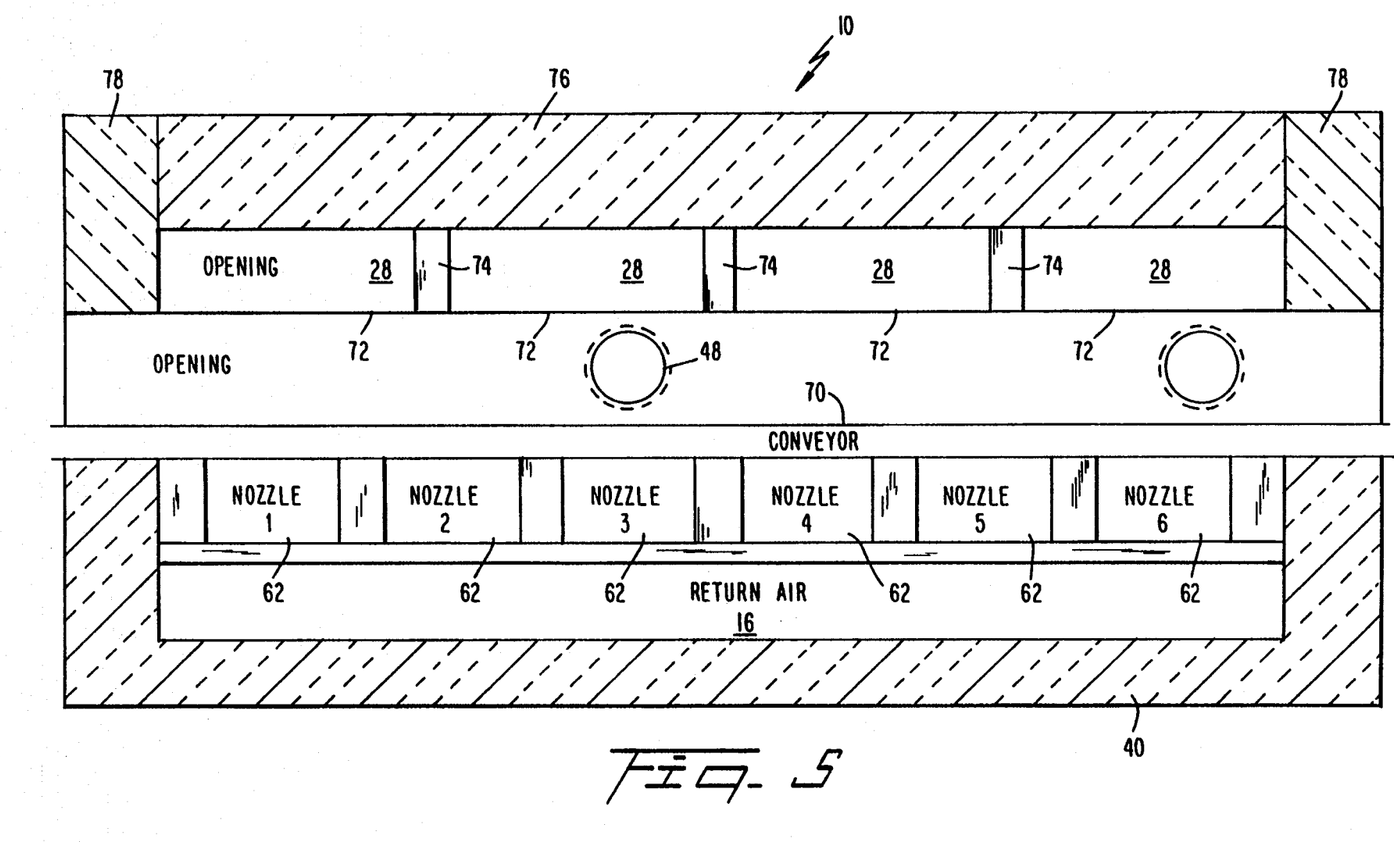
FIG. 5 is a longitudinal cross section taken along the path of the conveyor.

As also shown in FIG. 4 and 5, the lower plenum 14 may be a series of nozzles 62 mutually spaced along the lower portion of the conveyor 10. Typically, a pair of fans are used and each fan feeds three of such mutually spaced nozzles 62. If desired, seven nozzles may be utilized and the divider baffles 58 or 60 removed. It is preferred, however, to use the configurations shown in FIG. 4 with six nozzles. The nozzles 62 typically are four inches wide and taper from a maximum height of 2½ inches to a minimum of 0.5 inches at the front of the oven. As shown, the nozzles have a vertical air entrance 30 and each nozzle "finger" will have about 30 dimpled nozzles (not shown) having a diameter of preferably 0.4375 inches directing heated air upwardly into the heating chamber 18. The nozzle fingers 62 with six fingers provided will be 1.43 inches apart and with 7 fingers will be 0.75 inches apart whereby air will return from the heating chamber 18 to the return plenum 16 to be drawn back around the burner 20 by the blower 22.

As shown, two blowers 22 are utilized. These are counterclockwise fans. The blowers 22 are located symmetrically so that the distance between the inlets 54 is twice the distance between the inlet and the end wall of the cabinet 10. This is shown in FIG. 3. Theoretically, the capacity of the blowers 22 should have been around 600 cfm at an average speed of 1733 rpm. In actuality, the airflow capacity was on the order of 650 cfm on average.

With reference to FIG. 5, the conveyor 70 extends the length of the oven 10 and, as noted above, is 40 inches long. The center line of the blower 22 is intended to be at the midpoint between the conveyor surface 70 and the air plate 72 which makes up the bottom surface of upper plenum 12. The air plate 72 is 34 inches wide, and the opening 28 is 2.5 inches high so that the taper on the plenum 12 is from a maximum of 2.5 inches to a minimum of 0.5 inches. This is the same taper for the individual nozzles 62. The air plate 72 has mutually spaced holes which preferably are dimpled with diameters of 0.4375 inches which are disposed in rows. Air plate 72 is continuous and is the lower boundary for upper plenum 12 which is open from left to right in FIG. 5. The support members 74 divide the four discrete openings 28 which allow air to pass from opening 28 to upper plenum 12 or from 46 to 12. The upper portion of the cabinet 76 is insulated as are the end portions 78.

As will be obvious to those skilled in the art, the number and spacing of the holes (not shown) in air plate 72 is a matter of design preference and rows of holes may be blocked to increase the flow through remaining holes, if desired.

In summary, it has been discovered that substantially efficiency can result in redesigning the interior of the conveyor ovens whereby elbows and corners are replaced by scrolls and rounded edges. In addition, the improvement also stems from relocating the burner tube into a location between the return plenum and the fan inlet, relocating the fan to a midpoint between the conveyor and upper plenum and dispensing air through smooth scrolled inlets into the upper and lower plenums. The upper and lower plenums further are tapered from a maximum width at the inlet to a width of no more than 15 percent of the maximum at the opposite end thereof to ensure a more uniform dispensing of heated air from the plenums onto the conveyorized food to be cooked. In addition, the lower plenum is made up of individual nozzles preferably three 4-inch nozzles per fan. Efficiency is further improved by using fans which rotate counterclockwise in plan view whereby the circulation of air from the burner rotates in the same direction as the fan with the air being dispensed into the plenums from fan exits intended to pick up the tangential discharge of the counterclockwise rotating fans. While seven nozzles fingers could be provided for the lower plenum, preferably two fans and three nozzle fingers per fan are used. The fan exits into the inlets for the upper and lower plenums further may be separated by baffle plates if desired. Flues are further provided in the inlets to the upper and lower plenums.

The conveyor oven of this invention then typically has a conveyor length of 40 inches and a conveyor width of 32 inches and, in such a design, the airflow was found to be increased by 73% over conventional designs. In other words, the device of this invention could be 73% larger with a given fan and motor than conventional devices to achieve uniform cooking.

I claim:

1. A conveyor oven for cooking food products with an enhanced flow of hot gases directed onto said products as they are conveyed through the oven from an entrance to an outlet comprising:

a housing having a tunnel-like cavity therethrough with an entrance end and an outlet end and an endless, open-mesh conveyor extending through the cavity, means forming a first plenum chamber formed within said housing over said conveyor and means forming a second plenum chamber formed within said housing under said conveyor and first and second nozzle means coupled to said first and second plenum chambers for dispensing, hot gases from said chambers, respectively, onto the upper and lower surfaces of said conveyor;

first and second inlet ports, respectively, for each of said chambers said ports being substantially contained in a common vertical plane;

fan means having an outlet and a downwardly opening inlet disposed perpendicular to the fan outlet for directing heated air into said plenum chambers through said inlet ports;

means forming a third plenum chamber disposed below said second plenum chamber, within said housing, having an inlet in communication with the cavity in said housing and an outlet port;

burner means disposed within said housing between the outlet port to said third plenum and the inlet to said fan for heating air from said third plenum and directing the same into the inlet to said fan;

enhanced air flow means within said housing including a baffle plate disposed at the fan outlet between the first and second chamber inlet ports having a pair of rounded edges forming adjacent edges of said inlet ports; a pair of rounded scroll plates disposed between the fan outlet and first and second chamber inlet ports and forming opposite edges of said inlets for directing a smooth flow of heated air in a stream from said fan, divided by said baffle plate into substantially two equal streams into said plenum chambers, the outlet port from said third chamber being immediately below the inlet to said second chamber so that the scroll plate forming an edge thereof on an upper surface forms an edge of the third chamber outlet port with the lower surface thereof, which surface also surrounds a portion of said burner means and terminates forming a portion of the inlet to said fan; and a third scroll plate forming an edge by the outlet port to said third plenum chamber at one end and a portion of the fan inlet at an opposite end said third scroll surrounding a portion of said burner opposite said second scroll plate for smoothly directing air from said third chamber around said burner and into said fan.

2. The oven of claim 1 wherein said scroll plates are rounded on a radius of about 2 inches.

3. The oven of claim 2 wherein the rounded edges of said baffle plate are rounded on a radius of about 1¼ inches.

4. The oven of claim 1 wherein said first and second plenum chambers extend laterally across said conveyor with the inlet ports contained in a vertical plane disposed parallel to an edge of said conveyor, said plenums tapering in height from a maximum height at the inlet port to a minimum height of no more than 15% of the maximum at the ends thereof opposite the inlet ports.

5. The oven of claim 4 wherein the maximum height of said chambers is 2½ inches.

6. The oven of claim 5 wherein the second plenum chamber comprises a plurality of mutually spaced fingers extending laterally across the bottom of said conveyor from the entrance end to the outlet end of said cavity.

7. The oven of claim 6 wherein a pair of fans are provided and six of said fingers with each fan supplying three of said fingers with heated air.

8. The oven of claim 7 wherein baffle means separates the fan outlets directing air from each outlet into three fingers.

9. The oven of claim 8 further comprising flue means adjacent each fan outlet.

10. The oven of claim 6 wherein said second nozzle means includes a plurality of nozzles disposed the length of each finger along the surface thereof adjacent said conveyor.

* * * * *

UNITED STATES PATENT AND TRADEMARK OFFICE
CERTIFICATE OF CORRECTION

PATENT NO. : 5,421,316
DATED : June 6, 1995
INVENTOR(S) : Albert J. HEBER

It is certified that error appears in the above-indentified patent and that said Letters Patent is hereby corrected as shown below:

Column 5, line 33, change "[he" to --the--.

Column 6, line 23, change "substantially" to --substantial--.

Signed and Sealed this

Twelfth Day of September, 1995

Attest:

BRUCE LEHMAN

Attesting Officer    Commissioner of Patents and Trademarks